Nov. 19, 1935.  J. F. MATTEO  2,021,515
CLIP FOR CATENARY SUSPENSION SYSTEMS
Filed Jan. 15, 1934   2 Sheets-Sheet 1
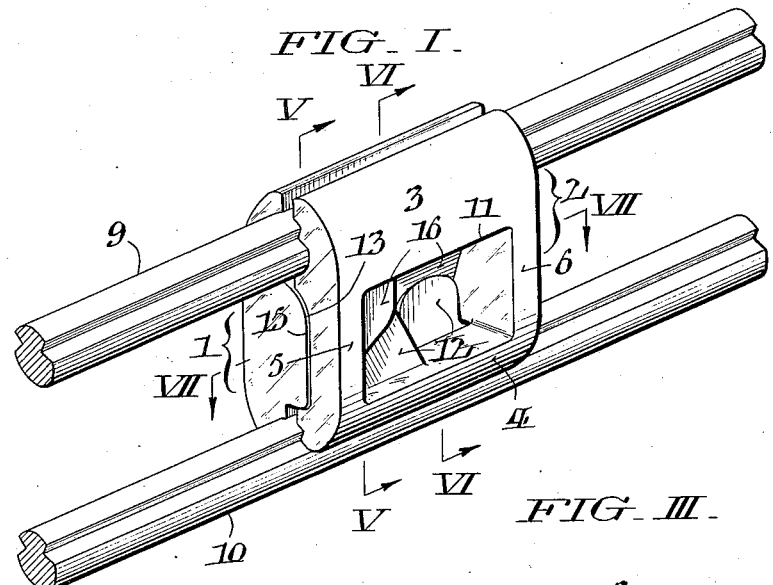
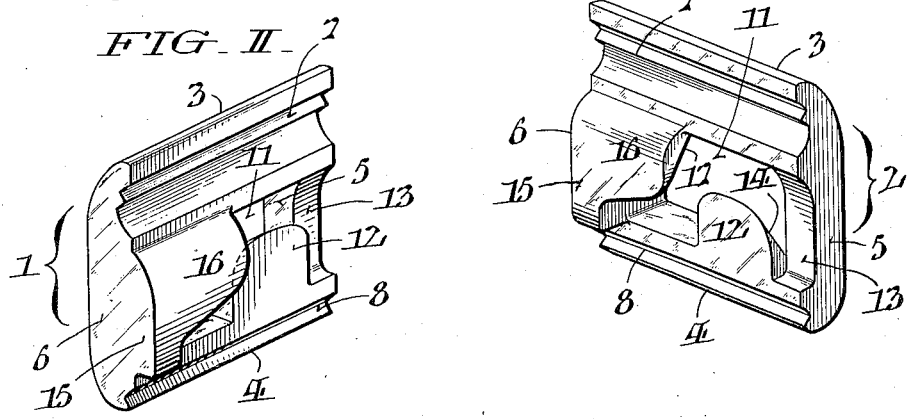
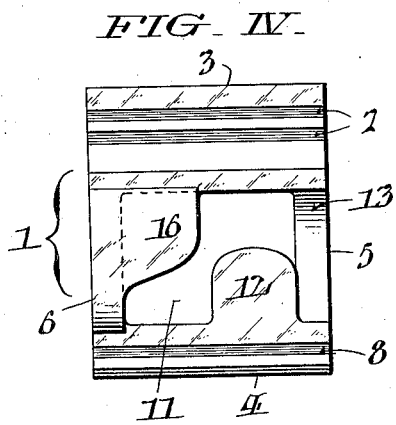
INVENTOR:
Joseph F. Matteo,

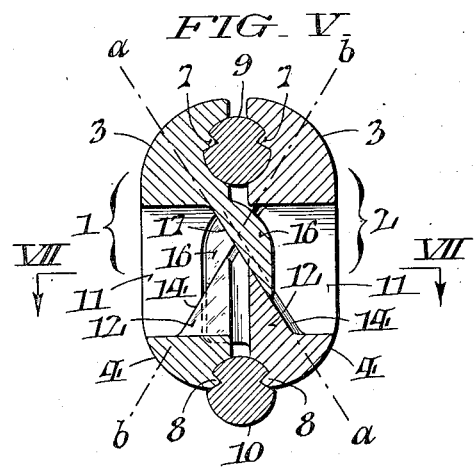
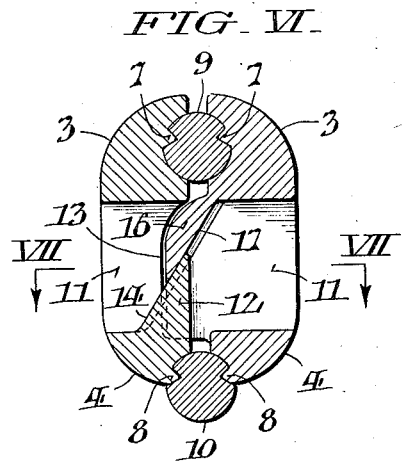
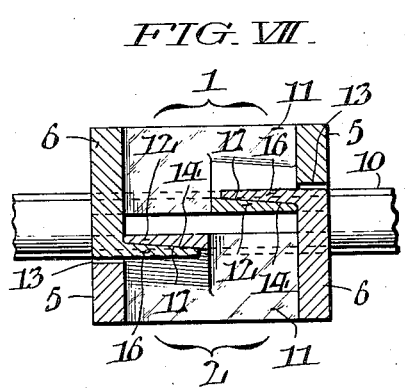
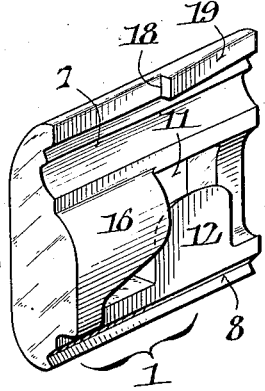
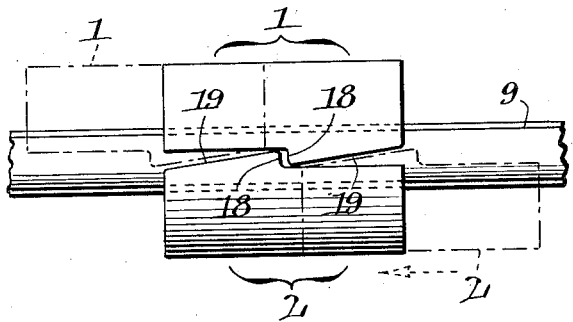

Patented Nov. 19, 1935

2,021,515

UNITED STATES PATENT OFFICE 2,021,515

CLIP FOR CATENARY SUSPENSION SYSTEMS

Joseph F. Matteo, Philadelphia, Pa.

Application January 15, 1934, Serial No. 706,695

11 Claims. (Cl. 191—43)

This invention relates to clips of a split type useful more particularly in connection with catenary trolley wire suspension systems for high tension electric railways to support and maintain, in vertically-spaced relation, the two parallel conductor wires ordinarily embodied in such systems.

The usual forms of clips of the kind referred to require screw bolts, rivets or cotter pins, to secure their opposing jaw components in clamping engagement with the parallel wires. Accordingly, the attachment of the clips initially, and the subsequent removal of them when replacement of the trolley wires is necessitated by reason of excessive wear, are not only tedious and time consuming operations, but entail the aid either of wrenches or special riveting and extracting means in their accomplishment.

Considered from the broadest aspect, my invention is directed toward overcoming the several drawbacks which have been pointed out above, or, in other words, it has for its chief aim to make it possible to secure clips for catenary suspension systems without the need of separate securing means or of special tools for the purpose. This desideratum I attain, as hereinafter more fully disclosed, in a split clip whereof the two clamp components are exact and interchangeable counterparts of each other, and integrally formed with wedge projections, which, by interengagement incident to assembling of the clip by endwise shifting of the components, draw said components into tight clamping relation with the wires.

Another object of my invention is to positively insure against the possibility of separation or relative displacement of the components of the clip in use, through incorporation with them of means capable of interlocking automatically incident to assembling of the clip in the manner aforesaid.

In the drawings, Fig. I is a fragmentary perspective view showing my novel clip in use.

Figs. II and III are perspective views of the two clamp components of the clip, showing, more particularly, the inner sides thereof.

Fig. IV shows the inner side of one of the clips in elevation.

Figs. V and VI are cross-sectional views taken respectively as indicated by the arrows V—V and VI—VI in Fig. I.

Fig. VII is a longitudinal sectional view taken as indicated by the arrows VII—VII in Fig. I.

Fig. VIII is a view corresponding to Fig. VII and showing how the clip components are assembled.

Fig. IX is a perspective view of a slightly modified clip component; and,

Fig. X is a top plan view of an assembled clip embodying components of the form shown in Fig. IX.

As delineated in Figs. I–VI, my improved clip comprises two substantially rectangular, centrally-open opposing clamp components 1 and 2 which are exact counterparts of each other, and which, in practice, are preferably made from a metal, such as brass or copper, high in electrical conductivity. The horizontal top and bottom bars 3 and 4 of the components 1 and 2 are connected by vertical end bars 5 and 6, said horizontal bars being grooved as at 7 and 8, see Figs. II and III, for capacity to engage the correspondingly grooved, vertically-spaced parallel trolley wires 9 and 10 from opposite sides as shown in Figs. I, V, and VI. Upstanding from the lower horizontal bar 4 at the inner side of each of the components 1 and 2, adjacent the end bar 5 and within the confines of the central opening 11, is a projection 12 having, in spaced relation with respect to a central recess 13 in said end bar 5, a wedge surface 14 which is inclined both longitudinally and transversely of the clip, as will be best understood by reference to Figs. V, VI, and VII. Pendant from the upper horizontal bar 3 of each component 1 and 2, similarly within the confines of the central opening 11 and reaching inward in integral continuation from a centrally extended portion 15 of the end bar 6, is a laterally offset projection 16 having a wedge surface 17, which, like the wedge surface 14 of the projection 12, is inclined both longitudinally and transversely of the clip, but in the opposite direction.

To assemble the clip, the components 1 and 2 are placed against the opposite sides of the wires 9 and 10, as shown in Fig. VIII, and then forcibly slid toward each other as indicated by the arrows. Incident to such relative shifting of the components, the upstanding projection 12 of the one will interengage with the pendant projection 16 of the other until the wedge surfaces 14 and 17 of said projections contact firmly, as shown in Fig. VII. From Fig. V it is to be especially noted that the contact areas between the respective wedge projections 12 and 16 lie in planes a—a and b—b which intersect crosswise of the clip, with said areas disposed in spaced relation laterally of the clip. Due to coaction between the contacting wedge surfaces 14 and 17, respectively, of the projections 12 and 16 incident to assembling of the clip, the components 1 and 2 will be gradually drawn toward each other until they are brought into tight clamping relation with the wires 9 and 10, as shown in Figs. V, VI, and VII. Due to the comparative softness of the metal, the opposing wedge surfaces 14 and 17 snugly adapt themselves to each other, as a consequence of which they can be relied upon ordinarily to hold the clamp components securely and tightly assembled. With the device assembled, it is to be further noted from Figs. I and VII that the widened web portions 15 of the bars 6 fit into the recesses 13 in the bars 5 to completely close in the ends of the clip and to determine exact vertical alignment of the components 1 and 2. Attachment of the clip can obviously be accomplished easily and quickly by striking the opposite ends of the components with a hammer or other similar implement. Removal of the clip, on the other hand, is similarly accomplishable, quickly and readily, by reversing the process.

When greater security, than that obtainable alone through the friction of the wedge surfaces 14 and 17 is desired, I resort to the construction shown in Figs. IX and X where the upper horizontal bar 3 of each clip component 1 and 2 is formed with a shoulder 18 which is approached by an incline or slope 19. During assembling of the two components in the manner described heretofore, i. e., by shifting them endwise relatively as indicated by the arrows in Fig. VIII, the inclines 19 will ride upon each other until the shoulders 18 finally pass each other and interlock positively to insure against the possibility of subsequent accidental separation or displacement of said components. In all other respects, the modified form of the clip is identical with the clip shown in Figs. I–VIII.

From the foregoing it will be apparent that I have provided a clip which is comparatively light in weight, and which is easily and quickly assembled without the need of separate securing devices or special tools for the purpose.

Having thus described my invention, I claim:

1. In a clip of the character described, a pair of identical, interchangeably-usable components grooved top and bottom to clampingly engage parallel wires from opposite sides, and having, intermediate the wire-engaging grooves, interengageable single-bevel wedge projections operative, upon relative movement of said components incident to assembling the clip, to draw said components together into clamping relation with the wires.

2. In a clip of the character described, a pair of identical, interchangeably-usable components grooved top and bottom to clampingly engage parallel wires from opposite sides, and having intermediate the wire-engaging grooves, longitudinally-engageable single-bevel wedge projections operative, upon relative shifting of the components endwise along the wires incident to assembling the clip, to draw said components together into clamping relation with the wires.

3. In a clip of the character described, a pair of identical, interchangeably-usable components grooved top and bottom to clampingly engage parallel wires from opposite sides, and having intermediate the wire-engaging grooves, longitudinally-interengageable single-bevel wedge projections adapted to overlap in different planes transversely of the clip upon relative shifting of the components endwise along the wires incident to assembling the clip, to draw said components together into clamping relation with the wires.

4. In a clip of the character described, a pair of identical, interchangeably-usable components grooved top and bottom to clampingly engage parallel wires from opposite sides, and having intermediate the wire-engaging grooves, longitudinally-interengageable single-bevel wedge means adapted to overlap in intersecting angular planes transversely of the clip upon shifting of the components endwise along the wires incident to assembling the clip, to draw said components together into clamping relation with the wires.

5. In a clip of the character described, a pair of identical interchangeably-usable components grooved top and bottom to clampingly engage parallel wires from opposite sides, and having intermediate the wire-engaging grooves, opposing single-bevel wedge projections sloped both longitudinally and transversely of the clip for interengageability, upon relative shifting of the components along the wires incident to assembling of the clip, to draw said components together into clamping relation with the wires.

6. A clip of the character described comprising a pair of identical substantially rectangular, interchangeably-usable components grooved top and bottom to clampingly engage parallel wires from opposite sides, each such component having intermediate the wire-engaging grooves, at its inner side adjacent one end thereof and reaching up from its bottom portion, a projection with a single-bevel wedge surface inclined longitudinally of the clip, and adjacent the other end and pendant from the upper portion thereof, a laterally offset projection with a single oppositely inclined longitudinal wedge surface, whereby, upon relative endwise movement of the two components along the wires incident to assembling the clip, the upward projection of the one will interengage and cooperate with the pendant projection of the other to draw said components together into clamping relation with the wires.

7. A clip of the character described comprising a pair of identical, substantially-rectangular, interchangeably-usable components grooved top and bottom to clampingly engage parallel wires from opposite sides, each such component having intermediate the wire-engaging grooves, at its inner side adjacent one end thereof and reaching up from its lower portion, a projection with a single-bevel wedge surface inclined both longitudinally and transversely of the clip, and adjacent the other end thereof and pendant from its upper portion, a laterally offset projection with a single-bevel wedge surface likewise inclined both longitudinally and transversely of the clip but in the opposite direction, whereby, upon relative endwise shifting of the two components along the wires incident to assembling the clip, the upward projection of the one will interengage and cooperate with the pendant projection of the other to draw said components together into clamping relation with the wires.

8. A clip of the character described comprising a pair of identical, substantially rectangular, centrally-open interchangeably-usable components grooved top and bottom to clampingly engage parallel wires from opposite sides, each such component having at the inner side within the confines of its opening adjacent one end thereof and intermediate the wire-engaging grooves, an upstanding projection with a longitudinally inclined single-bevel wedge surface, and pendant within the confines of said opening and adjacent the other end thereof a laterally offset projection with a longitudinal single-bevel wedge surface likewise inclined longitudinally of the clip but in the opposite direction, whereby, upon relative endwise shifting of the two components along the wires incident to assembling the clip, the upstanding projection of the one will interengage and cooperate with the pendant projection of the other to draw said components together into clamping relation with the wires.

9. A clip of the character described comprising a pair of identical, substantially rectangular, centrally-open interchangeably-usable components grooved top and bottom to clampingly engage parallel wires from opposite sides, each such component having at its inner side within the confines of its central opening adjacent one end thereof in laterally spaced relation to a central recess in such end and intermediate the wire-engaging grooves, an upstanding projection with a single-bevel wedge surface inclined both longitudinally and transversely of the clip, and adjacent the other end bar thereof and pendant from its upper portion within the confines of the central opening a laterally-offset pendant projection which is continuous with a widened central portion of the last mentioned end bar and formed with a single-bevel wedge surface inclined both longitudinally and transversely of the clip but in the opposite direction, whereby, upon relative endwise shifting of the two components along the wires incident to assembling the clip, the upstanding projection of the one will engage and coact the pendant projection of the other to draw said components together into clamping relation with the wires, with attendant closure of the ends of the clip through fitment of the widened end portion of one component into the recess in the contiguous end of the other component.

10. A clip of the character described comprising a pair of identical interchangeably-usable components grooved top and bottom to clampingly engage parallel wires from opposite sides, and having intermediate the wire-engaging grooves, opposing single-bevel wedge projections capable of interengaging upon relative movement of the components incident to assembling the clip, to draw said components into clamping relation with the wire, as well as means whereby said components are concurrently interlocked against the possibility of subsequent separation or displacement.

11. In a clip of the character described, a pair of identical interchangeably-usable components grooved top and bottom to clampingly engage parallel wires from opposite sides, and having intermediate the wire-engaging grooves, opposing single-bevel wedge projections interengageable upon relative movement of the components ircident to assembling the clip, to draw said components into clamping relation with the wires, as well as opposing shoulders approached by inclines which, incident to assembling of the clip as aforesaid, are adapted to override each other until the shoulders interlock to hold the components against subsequent separation.

JOSEPH F. MATTEO.